April 25, 1961   J. F. LASH   2,981,112
UNBALANCE MEASURING APPARATUS
Filed Nov. 30, 1955
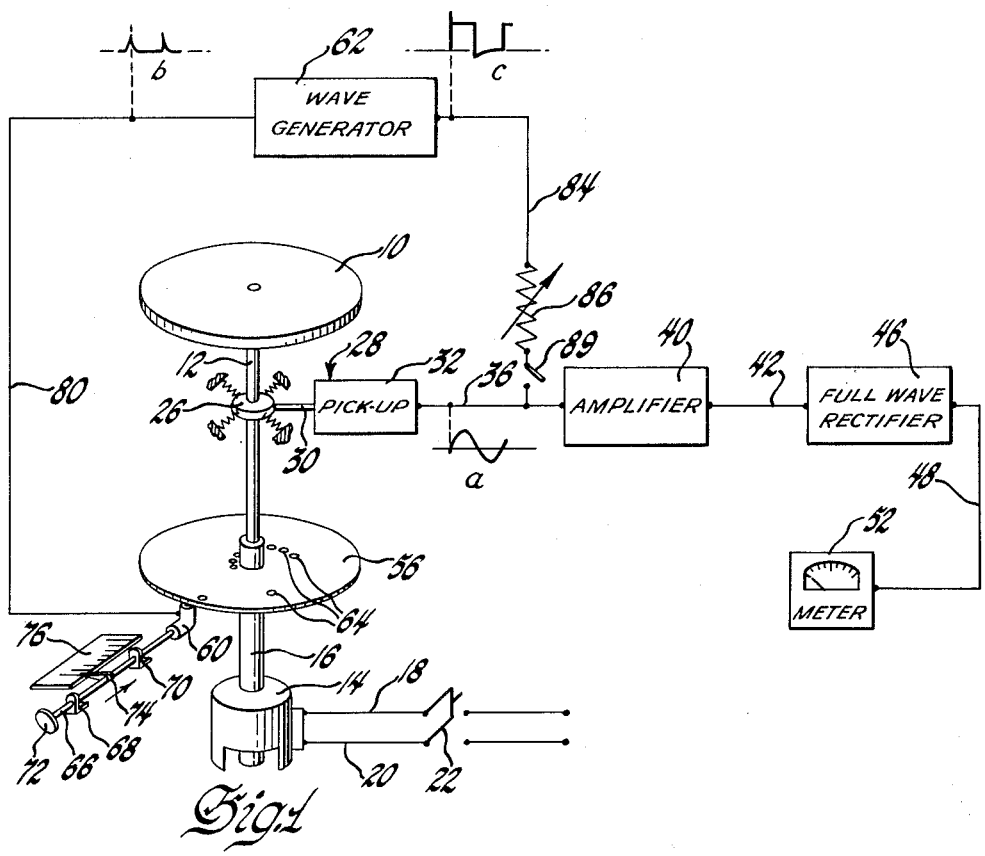
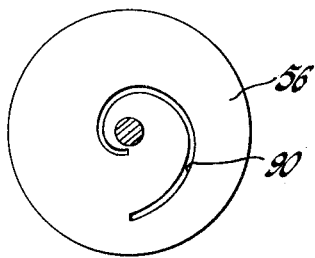
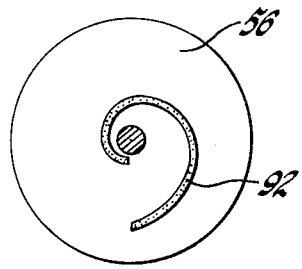
INVENTOR
Joseph F. Lash
BY
E. W. Christen
ATTORNEY

United States Patent Office 2,981,112
Patented Apr. 25, 1961

2,981,112

UNBALANCE MEASURING APPARATUS

Joseph F. Lash, Ferndale, Mich., assignor to General Motors Corporation, Detroit, Mich., a corporation of Delaware Filed Nov. 30, 1955, Ser. No. 550,035

2 Claims. (Cl. 73—462)

This invention relates to apparatus for measuring the amplitude and location of unbalance in a rotating body and has for its general object to provide a unique, extremely simple and yet versatile apparatus for performing such measurements.

In distinction to prior forms of unbalance measuring apparatus using a stroboscopic flash lamp, a reference alternator or adjustable commutator device for determining the angular location of unbalance in a workpiece, the present invention features a unique phase disk arrangement and adjustable, electrical pickup for this purpose and accomplishes such measurements with an extremely simple apparatus using a minimum number of parts.

The invention, both as to its organization and operation, will appear more fully from the following description and drawings, wherein:

Fig. 1 is a diagrammatic illustration of the general organization of an unbalance measuring apparatus using the phase disk of the present invention; and Figs. 2 and 3 are views of alternative forms of phase disks that may be employed in the apparatus of Fig. 1.

The invention is shown in a balancing machine in which the part 10, whose characteristics of unbalance are to be determined, is mounted on a vertically disposed, flexibly mounted spindle 12 which is driven by a constant speed electrical drive motor 14 having a hollow drive shaft 16. The motor 14 is adapted to be connected over conductors 18, 20 through a switch 22 to a suitable source of electrical power. The machine spindle 12 extends coaxially through the hollow drive shaft of the motor and is connected at its lowermost end to the lower end of the drive shaft 16 through a universal joint or connection, in known manner. The uppermost portion of the balancing machine spindle is resiliently supported in a spring mounted bearing 26 which permits oscillation or deflection of the balancing machine spindle under the influence of unbalance in the workpiece.

Suitably mounted in contacting relation with the machine spindle 12 or bearing 26 is the movable probe 30 of an electro-dynamic pickup transducer 28 having a stator casing 32 fixedly mounted on a stationary part of the balancing machine. The pickup is of conventional design and is adapted to develop an alternating current, in response to movement of the spindle 12 toward and away from the casing 32. This current will be a sinusoidal signal shown by the curve $a$. This signal will have a frequency corresponding to the speed of the drive motor and an amplitude in accordance with the amount of unbalance in the workpiece as determined by the amount of deflection of the balancing machine spindle in a horizontal plane containing the movable probe of the pickup. The electrical signal developed by the pickup will bear a variable phase relationship with respect to a fixed point on the spindle or workpiece.

The various elements of the electrical measuring apparatus of Fig. 1 are shown in block diagrammatic form with their interconnections shown in single line, diagrammatic form, the remaining connection for each of which being connected to ground for completing their individual circuits. The output from the pickup 28 is applied over line 36 to the input of a conventional amplifier 40. The output of the amplifier is in turn connected over line 42 to a full-wave rectifier shown at 46 which may be of the electronic vacuum tube or dry-type variety or of the mechanical variety. The output of the rectifier is connected over line 48 to a conventional D.C. indicating instrument shown at 52.

In accordance with the present invention there is included in the balancing organization above described, a phase disk 56, which is mounted on and rotates with the shaft 16 of the drive motor, a radially positionable magnetic pickup 60, which cooperates with the phase disk to produce a reference signal having a known phase relation with respect to the said fixed point on the spindle, and a suitable wave generating means 62, which may be of the electronic variety.

The phase disk 56 may be constructed of steel, for example, and may be perforated with a number of holes 64 which are spaced an equal number of degrees apart, with each successive hole being at a slightly different radius from the center of the disk so as to define collectively a generally spiral-shaped curve, such as an Archimedean spiral, in which the increment of increase in successive radii is constant. The magnetic pickup 60, which may be of most any commercially available variety, is mounted on an axially translatable push rod 66 supported between a pair of spaced brackets 68 and 70 and is provided with a push knob or button 72 at its end opposite the pickup 60. The rod 66 also carries intermediate its ends an indicator or pointer 74 that cooperates with a stationary, uniformly graduated indicia plate 76 which may be mounted on a stationary part of the balancing machine. The scale is uniformly and linearly calibrated, and each graduation thereon may correspond to the radial position of a particular hole in the disk so that the probe may be located at a radial position corresponding to any hole.

The output of the pickup 60 is shown at $b$ as a periodically occurring pulse having a repetition rate corresponding to the speed of the spindle and is applied over line 80 to the input of the wave generator 62. This generator may be of any desired type in which the pulses from pickup 60 will trigger the generator and produce a signal in the output having any desired wave form. In the present instance the wave generator is a conventional one-shot Eccles-Jordan multi-vibrator generating a symmetrical square wave, such as is shown at $c$, having equal on-off half-periods and a total period or reptition rate corresponding to the speed of the drive spindle. The output of the wave generator 62 is applied over line 84 through an adjustable attenuator 86 to the input of the amplifier 40 where it is combined with the output of the pickup device 28.

By adjusting the rod 66 in and out radially of the disk, the phase relationship between the square wave generated by the generator 62 and the unbalance sine wave developed by the pickup 28 can be varied. When the probe is adjusted so that the square wave is approximately in phase with the unbalance signal, the meter 52 will read a maximum. When these signals are 180 degrees out of phase, the meter will read a minimum. If there is no unbalance in the workpiece 10, the meter reading will remain unchanged as the probe scans the disk.

The position of the probe when a maximum or minimum has been found, indicates the location of the unbalance which may be read from the position of the indicator 74 relative to the graduated indicia on the indicator plate 76. Where the amplitude of the unbalance signal is less than that of the attenuated square wave reference signal, the difference between maximum and minimum meter readings will be twice the amplitude of unbalance. The magnitude of unbalance also could be indicated by opening switch 89 and applying only the output of the unbalance pickup 28 to the amplifier, rectifier and meter.

It is, of course, apparent that there are numerous other means by which a reference signal may be obtained from the phase disk 56. The disk may be provided with a reference marker of any suitable type that will cooperate with the pickup 60 to produce a reference signal. For example, in Fig. 2 the disk is slotted as shown at 90 with the spaced walls of the slot being shaped to conform to a 360 degree segment of an Archimedean spiral. The continuous slot enables the magnetic pickup to scan a continuous range of angular positions of the disk. As a further alternative, the spiral strip 92 of magnetic material may be provided on a non-magnetic disk to actuate a magnetic pickup.

While electronic resolving circuits and the like could be employed to provide an electronic wave generator having a sinusoidal output, the square wave multi-vibrator appears to be the simplest, least expensive, electronic device that could be employed for the wave generating means 62 employed in the present invention. Since the square wave will have a fundamental frequency component corresponding to the frequency of the unbalance pickup signal, this component may be mixed or combined readily with the unbalance signal to produce a resultant signal whose amplitude will vary sufficiently and enable determining the magnitude and the location of the unbalance in accordance with the principles of the present invention. Where the output of the magnetic pickup is of sufficient energy, the wave generating means 62 might be eliminated and the output of the magnetic pickup could be combined directly with the unbalance pickup signal.

The above described apparatus for indicating unbalance has been found well suited for use in multi-station type balancing installations having a final check or inspection station for performing a final inspection for any remaining unbalance after the parts have been corrected. A balancing installation of this character is disclosed in copending U.S. application Serial No. 550,151, now Patent No. 2,898,764, filed November 30, 1955, in the names of C. J. Kinsey and J. H. Varterasian and of common ownership herewith. The check station would normally have an unbalance pickup, amplifier, rectifier and a pass-reject relay. In such installations it is good practice to inspect occasionally the balance of the spindle at the inspection station with a master part to determine the magnitude and the location of any residual unbalance that might be found in order that the system will be properly calibrated. The apparatus described conveniently provides this information simply by the addition of the phase disk, magnetic probe and the one-shot multi-vibrator.

While the apparatus has been described in connection with a balancing machine in which the characteristics of unbalance are determined in a single transaxial plane of a workpiece, the apparatus can, of course, be employed with other forms of balancing apparatus including dynamic balancing machines for balancing of axially elongated workpieces, the characteristics of unbalance of which are to be determined in a plurality of spaced transaxial planes.

What is claimed is:
1. In an unbalance indicating system for determining the magnitude and the location of unbalance in a rotatable workpiece including a flexibly-mounted drive spindle supporting said workpiece, a drive motor having a shaft coupled to said spindle, an unbalance pickup device contacting said spindle and developing an electrical unbalance signal having characteristics related to the magnitude and the location of unbalance in said workpiece, a phase disk driven from the shaft of said drive motor and having a spiral slot emanating radially outwardly from the center thereof, a magnetic pickup adjustably positionable radially of said disk and developing a reference signal pulse each time an aligned portion of said slot passes thereby, means connected to said magnetic pickup generating an electrical wave synchronized by the signal pulse from the magnetic pickup and having a period corresponding to the interval between successive pulses therefrom, means combining said electrical wave from said wave generating means with said unbalance signal from said unbalance pickup device, rectifying means connected to said last-named means, first indicating means connected to said rectifying means for indicating the average relative value of the vectorial sum of said unbalance signal and said electrical wave, and second indicating means connected to said magnetic pickup for indicating the radial position thereof with respect to the center of said disk, said radial position having a predetermined relation to the angular location of said aligned portion of said slot.

2. An unbalance indicating system for determining the unbalance in a workpiece, said system comprising means for rotatably driving said workpiece and including a phase disk driven in synchronous relation to said workpiece, an unbalance pickup responsive to vibrations from said workpiece to produce an unbalance signal indicative of the amplitude of the unbalance and having a predetermined phase relationship to the angular position of said unbalance, said disk having a spirally arranged reference marker, emanating radially outward from the center thereof, the radial location of any point on said marker having a predetermined relationship to the angular location thereof with respect to a fixed point on said disk, a radially movable reference pickup for radially scanning said phase disk and cooperating with said marker to produce a reference signal having a phase relationship with respect to said fixed point dependent on the radial position of said reference pickup, means for comparing said unbalance signal and said reference signal to determine the phase relationship between said signals, and means for indicating the radial position of said reference pickup when said signals have a predetermined phase relation.

References Cited in the file of this patent
UNITED STATES PATENTS

| | | |
|---|---|---|
| 2,050,073 | Thearle | Aug. 4, 1936 |
| 2,108,624 | Thearle | Feb. 15, 1938 |
| 2,243,457 | Esval | May 27, 1941 |
| 2,243,458 | Esval | May 27, 1941 |
| 2,403,513 | Forsberg | July 9, 1946 |
| 2,405,430 | Kent | Aug. 6, 1946 |
| 2,426,305 | Hope | Aug. 26, 1947 |
| 2,500,013 | Svensson | Mar. 7, 1950 |
| 2,622,437 | Frank | Dec. 23, 1952 |
| 2,636,381 | Hagg | Apr. 28, 1953 |
| 2,730,899 | Hellar et al. | Jan. 17, 1956 |

FOREIGN PATENTS

| | | |
|---|---|---|
| 91,385 | Switzerland | Nov. 1, 1921 |
| 474,673 | Great Britain | Nov. 1, 1937 |